United States Patent [19]

Hold et al.

[11] 4,255,059
[45] Mar. 10, 1981

[54] PROCESSING ELEMENT

[75] Inventors: Peter Hold, Milford, Conn.; Zehev Tadmor, Teaneck, N.J.; Lefteris N. Valsamis, West Haven, Conn.

[73] Assignee: USM Corporation, Farmington, Conn.

[21] Appl. No.: 971,513

[22] Filed: Dec. 20, 1978

[51] Int. Cl.³ .............. B01F 7/10; B29B 1/06; B29B 3/02

[52] U.S. Cl. ............. 366/97; 366/75; 366/307

[58] Field of Search .......... 366/52, 69, 136, 262–265, 366/293, 315, 302–307, 92–99, 230, 231, 336–340, 607; 425/224, 466; 415/90, 101; 72/60, 262, 270

[56] References Cited

U.S. PATENT DOCUMENTS

| | | | |
|---|---|---|---|
| 870,748 | 11/1907 | Selg | 366/607 |
| 3,556,413 | 1/1971 | Lindgren | 366/607 |
| 3,738,797 | 6/1973 | Robinson et al. | 366/607 |
| 4,049,240 | 9/1977 | Walters | 366/231 |
| 4,142,805 | 3/1979 | Tadmor | 366/97 |

*Primary Examiner*—Harvey C. Hornsby
*Assistant Examiner*—Timothy F. Simone
*Attorney, Agent, or Firm*—John P. Morley; Vincent A. White

[57] ABSTRACT

Improved means for aligning processing members at various positions in processing passages of rotary processors. Essentially, the alignment means (or alignment elements) comprise a non-rotatable member positioned in the processing passage and shaped to at least partially interfere with flow of material in the passage. The shaped member is designed to perform certain processing functions on material in the passage such as blocking, collecting, mixing, spreading, restraining etc. The member is positioned so as to be non-rotative with the passage but is flexibly supported so as to "float" axially in the passage and is self-centering in the passage by hydrodynamic action.

16 Claims, 17 Drawing Figures

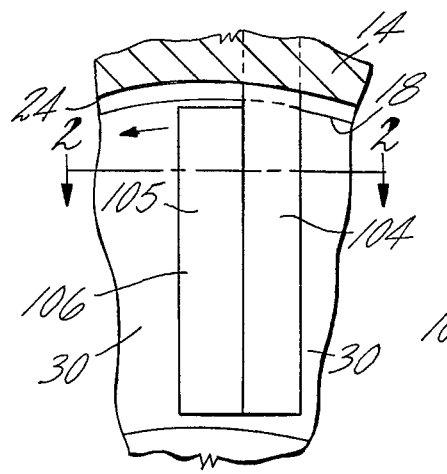
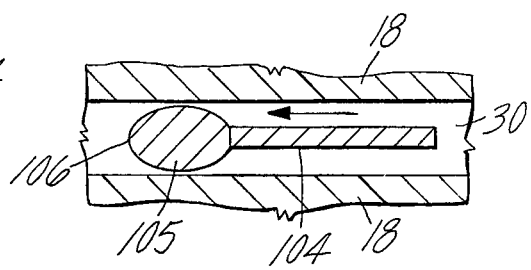
Fig.1  Fig.2
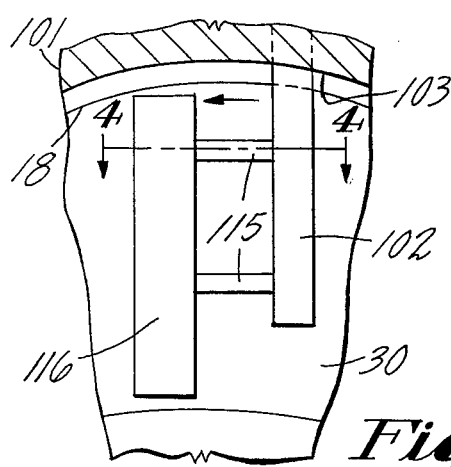
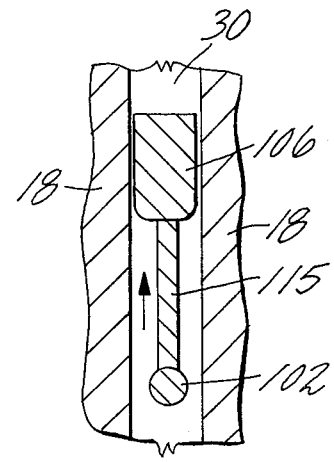
Fig.3  Fig.4
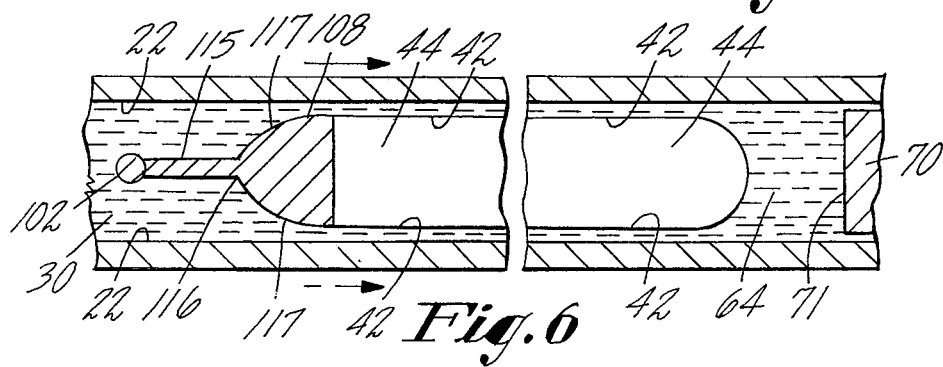
Fig.6

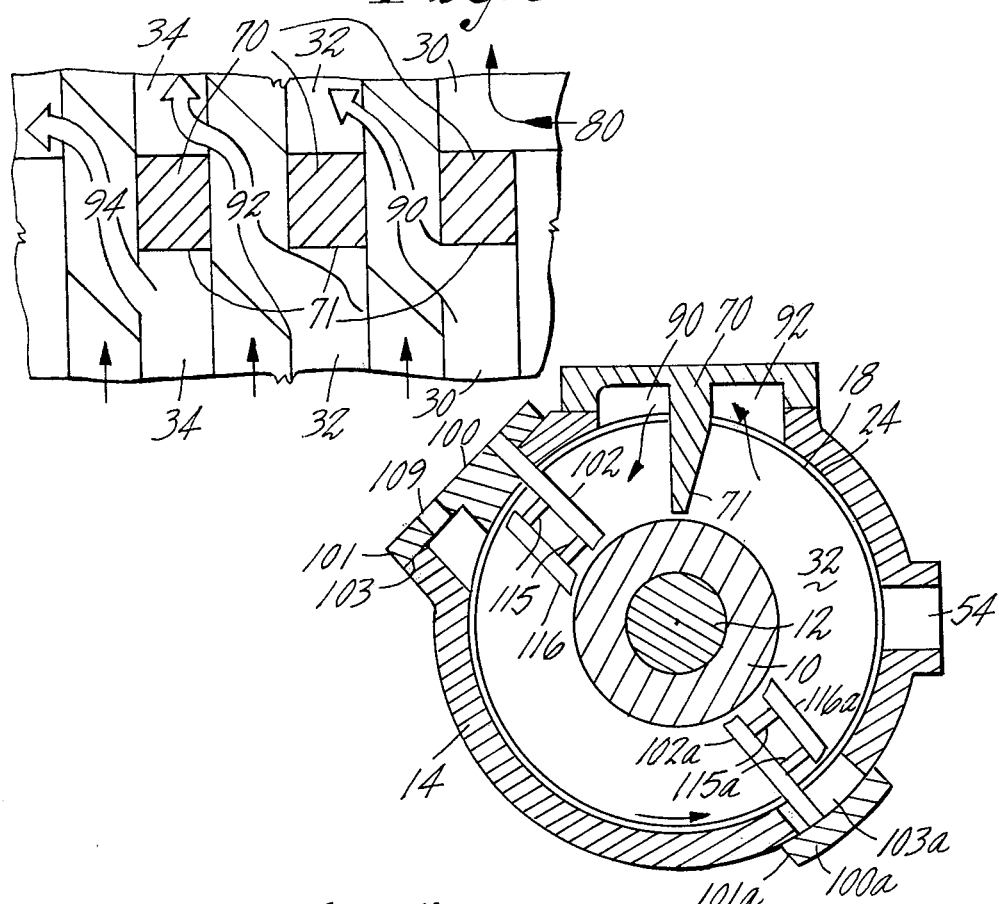
Fig. 8
Fig. 9
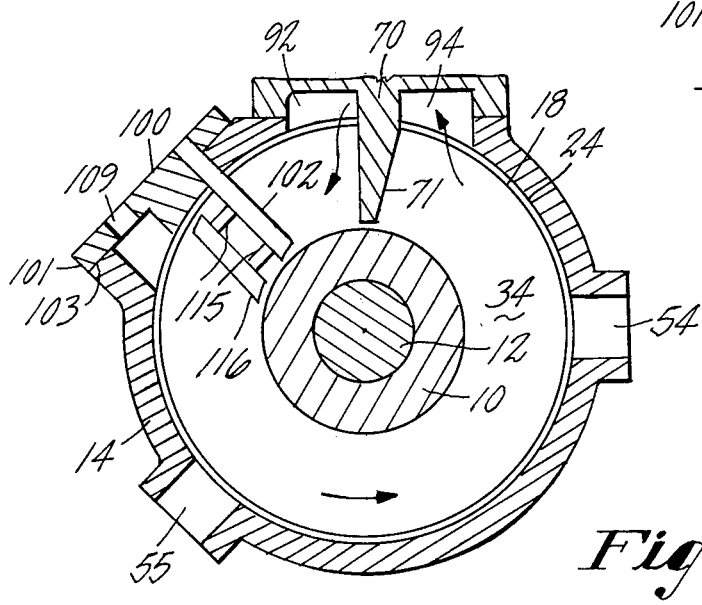
Fig. 10

PROCESSING ELEMENT

THE FIELD OF THE INVENTION

This invention relates to improved rotary processors for processing viscous or particulate materials particularly viscous or particulate plastic or polymeric materials.

DESCRIPTION OF THE PRIOR ART

U.S. Pat. No. 4,142,805 filed May 11, 1977, as a continuation-in-part of application Ser. No. 654,040 filed Feb. 2, 1976 (now abandoned) and copending U.S. patent application Ser. No. 898,178 filed Apr. 20, 1978 by Zehev Tadmor—one of the inventors of this application—disclose methods and apparatus for processing plastic or polymeric materials. U.S. Pat. No. 4,142,805 and application Ser. No. 898,178 are expressly incorporated here by reference.

The essential elements of the basic, individual processing unit or passage described in those Applications comprise a rotatable element carrying at least one processing channel and a stationary element providing a coaxial surface cooperative with the channel to form an enclosed processing passage. The stationary element has an inlet to feed material to the passage for processing and an outlet spaced apart from the inlet a major portion of the circumferential distance about the processing passage to discharge processed material from the passage. A member providing a material collecting end wall is associated with the stationary element and located in the passage near the outlet to obstruct or restrain movement of material fed to the passage and to coact with the rotating channel side walls to provide relative movement between the material and the channel side walls rotated toward the outlet. This distinctive coaction permits only liquid material in contact with the rotating channel side walls to be dragged forward to the end wall for controlled collection, processing and discharge. In the preferred embodiment of the invention described in U.S. Pat. No. 4,142,805 and application Ser. No. 898,178, the essential elements of the processing apparatus are arranged so that the rotatable channel carrying element is adapted for rotation in a stationary housing or chamber (the stationary element). The described processing channel and preferably a plurality of channels are formed in the cylindrical surface of a rotor with each channel having opposing side walls extending inwardly from the rotor surface. The stationary housing or chamber described has an internal, cylindrical surface providing the cooperative coaxial surface which together with the annular processing channel(s) form an enclosed processing passage(s).

The method and apparatus of the Tadmor Applications are described as useful for conveying of solids, melting or plasticating plastic or polymeric material; conveying, pumping or pressurizing viscous liquid material; mixing, blending, dispersing and homogenizing material; and devolatilizing and/or bringing about molecular or microscopic or macroscopic structural changes by chemical reactions such as polymerization.

These applications also disclose methods and apparatus having processing passages provided with mixing structures extending part way into the channels and positioned between the inlet and outlet of the passage. One mixing member particularly described is a partial dam which creates a void of material on its downstream face, e.g. the face of the mixing structure closest to the outlet. A port can be connected to the void to allow any materials volitalized to escape or, the port can be used as an inlet for adding materials to the void.

Application Ser. No. 849,184 filed Nov. 7, 1977 by Zehev Tadmor and Peter Hold—two of the inventors of this application—discloses and claims improved apparatus and methods particularly adaptable for devolatilizing liquid materials. Essentially, the invention of application Ser. No. 849,184 involves a devolatilizing passage provided by a rotatable and a stationary element. The rotatable element carries at least one devolatilizing channel while the stationary element provides a coaxial surface cooperative with the channel to form the enclosed devolatilizing passage. The stationary element also provides an inlet and an outlet for the passage to feed and discharge liquid material to and from the passage. Also a member arranged with the stationary element is located in the passage near the outlet to provide a liquid material collecting end wall.

In accordance with the invention of application Ser. No. 849,184, especially efficient devolatilization is achieved by associating a liquid spreading member with the stationary element and positioned between the inlet and outlet and extending substantially into the devolatilizing channel. The shape of the spreading member is designed to spread liquid material toward the channel walls and to provide clearances between the sides of the spreading member and the side walls of the channel. As the rotatable element is rotated, a dragging action is established between the rotating side walls and liquid material between the inlet and the spreading member so that the liquid material is spread on the inner surfaces of the rotating side walls and dragged through the clearance as thin layers and beyond the spreader to be collected as a pool at an end wall and discharged through the outlet. Because the liquid material is distributed as thin layers on the rotating side wall surfaces, a central space of the passage downstream of the spreader free of material is provided. A port is connected to the central space to pass material to or from the free central space. The invention of application Ser. No. 849,184 therefore provides a surface area to volume ratio for a devolatilizing passage which markedly improves the overall transfer efficiency of material(s) to or from the thin layers of viscous material distributed on and carried by the rotating walls.

Application Ser. No. 971,331 entitled "Method and Apparatus for Processing Plastic and Polymeric Materials" has been filed concurrently with the present application as a continuation-in-part of application Ser. No. 849,184 mentioned above. This, continuation-in-part Application presents additional structural and operational features developed since the filing of application Ser. No. 849,184 and provide special advantages and improvements in the overall performance characteristics of the apparatus and methods of application Ser. No. 849,184.

U.S. pat. application Ser. No. 971,332 entitled "Processes and Apparatus for Processing Plastic and Polymeric Materials" has also been filed concurrently with this application by Zehev Tadmor, Peter Hold and Lefteris Valsamis. The invention disclosed in that application relates to processes and apparatus particularly adaptable for melting and processing particulate plastic or polymeric materials. In accordance with the invention of that application, a particulate material obstructing surface is positioned between the inlet and outlet of the passage and is spaced apart from and prevents movement of unmelted particulate material to the material collecting end wall. Accordingly, only melted viscous material is carried by the channel side walls past the surface which restrains movement of unmelted material to the material collecting end wall. All of the above applications are expressly incorporated here by reference.

From the above, it should be apparent that the processing passages disclosed in each of the above applications comprise at least means for providing relative movement between the rotatable channel side walls and the main body of material in the channel and a material collecting end wall. However, the versatility and adaptability of the basic processing apparatus can be greatly expanded by providing additional members in the processing passages which can mix, spread, or restrain material being processed. With any of the processing members described above, it is usually important that the member be centered between the channel side walls of the passage. Otherwise misalignment can adversely impair or affect the efficiency of the assigned function of the surface providing member. This desired alignment can present complex and costly manufacturing problems particularly in rotary processor passages having relatively narrow widths between channel walls and particularly in rotary processors having a plurality of narrow processing passages. This invention is directed to this alignment problem and provides a novel, relatively simple and especially efficient solution for it.

BRIEF SUMMARY OF THE INVENTION

The invention disclosed and claimed in this application presents to the art novel, improved means for aligning processing members at various positions in processing passages of the types already described. In its simplest form, the alignment means (or alignment elements) comprise a non-rotatable member positioned in the channel and shaped to at least partially interfere with flow of material in the passage. The shaped member may be designed to perform certain processing functions on material in the passage such as blocking, collecting, mixing, spreading, restraining etc. The member is positioned so as to be non-rotative with the passage but is flexibly supported so as to "float" axially in the passage. In this manner, the "floating" member is self-centering in the channel by hydrodynamic action generated by passage of material between the opposite sides of the members and the side walls of the channel.

In its preferred form, the novel alignment elements comprise a base member which may be the stationary coaxial surface or a member adapted for attachment to the housing providing the coaxial surface. Securely carried by and fixed in the base member is a substantially rigid first member which extends into the passage. A second member is flexibly supported by the first member so that the second member can "float" in the passage. This floating or flexible relationship between the second member and the passage permits the second member to be centered in the channel without requiring precise and costly manufacturing. At least the flexibly connected member of the preferred alignment elements of this invention is shaped to interfere with flow of material in the passage to provide a desired processing function.

DESCRIPTION OF THE DRAWINGS

FIG. 1 is a side sectional view of an alignment element of the invention located in an annular material processing passage.

FIG. 2 is a section of the alignment element on line 2—2 of FIG. 1.

FIG. 3 is a view similar to FIG. 1 showing an alternate alignment element element of the invention.

FIG. 4 is a section of the alignment element on line 4—4 of FIG. 3.

FIG. 6 is a flattened sectional view of the passage shown in FIG. 5 taken along a selected radius and illustrating movement of material within the passage.

FIG. 8 is a simple flow diagram to show paths followed by material processed in the plurality of devolatilizing passages arranged as illustrated in FIG. 7.

FIG. 9 is a simplified schematic cross-sectional view taken on lines 9—9 of FIG. 7 showing the path of movement of material through a processing passage.

FIG. 10 is a simplified cross-sectional view taken on lines 10—10 of FIG. 7 and showing the path of movement of material through a processing passage.

DESCRIPTION OF A PREFERRED EMBODIMENT

Figure 5:
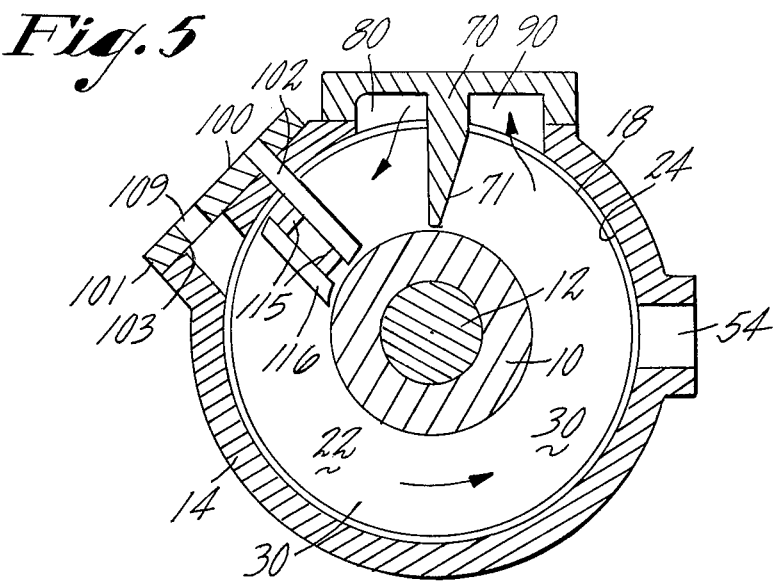
FIG. 5 is a simplified cross-sectional view of a devolatilizing passage of this invention taken along line 5—5 of FIG. 7 and illustrates the operation of the present invention and shows the path of movement of material through a processing passage.

FIGS. 1-4 illustrate novel alignment means or elements of this invention. FIGS. 1 and 2 illustrate the alignment element in its simplest form while FIGS. 3 and 4 illustrate an arrangement providing a preferred embodiment.

Referring first to FIGS. 1 and 2, the essential members of the alignment element of this invention is a material obstruction member 105 and flexible connecting means 104 shown as a relatively this but flexible member connecting member 105 to the stationary housing 14. The flexibility of connecting means 104 is selected so that member 105 will "float" or be self adjusting in passage 30 and can be centered in the passage 30 by hydrodynamic action of material moved toward surface 106 and past opposite sides of member 105. Surface 106 is shaped to provide a desired processing function for material processed in the channel such as blocking and collecting material, spreading material, mixing material, restraining material, etc.

The preferred alignment elements shown in FIGS. 3 and 4 comprise a base member 101—which may be part of surface 24 of stationary housing 14. Preferably however, base member 101 is adapted for attachment to housing 14. A first rigid member 102 is fixedly positioned in and carried by base member 101 and extends from surface 103 into passage 30. Flexible member(s) 115 connect a second member 116 to first member 102. Second member 116 also extends into passage 30 but is not connected directly to base member 101. Instead flexible connecting member(s) 115 permit second member 116 to "float" in passage 30 and the hydrodynamic action of material moved toward and around second member 116 centers it in the channel of passage 30. At least solid member 102 (or both 102 and 116) has a shape adapted to perform a predetermined processing function on the channel.

As mentioned, the alignment features of this invention are particularly adaptable for aligning and/or centering processing members in relatively narrow channels e.g. channels having a maximum width of about one inch or less. Accordingly, one preferred embodiment of the invention involves use of the alignment elements in a rotary processor having a plurality of devolatilizing passages of the type described in U.S. application Ser. No. 849,184 and in U.S. application Ser. No. 971,331 mentioned before. This embodiment of the invention is illustrated in FIGS. 5–10 and reference should be made to those Figures in connection with the following detailed description of the invention.

Figure 7:
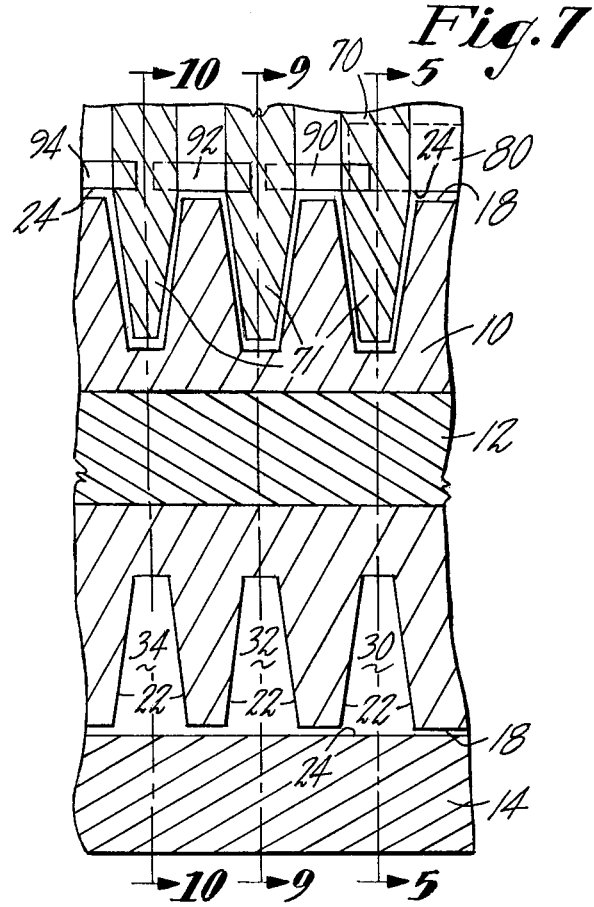
FIG. 7 is a sectional view along the axis of rotation of a plurality of interconnected devolatilizing passages each similar to that of FIG. 5.

FIGS. 5 and 7 illustrate a rotary processor having devolatilization passages which include an alignment element of this invention designated generally as 100. Essentially, the rotary processor includes a rotatable element comprising rotor 10 mounted on drive shaft 12 for rotation within a stationary element including housing 14. Rotor 10 has a surface 18, preferably cylindrical, as shown, and carrying a plurality of processing channels formed by opposing side walls 22 extending inwardly from surface 18. Housing 14 provides a suitably cylindrical surface 24 coaxial and cooperatively arranged with surface 18 of rotor 10 to form with the channels, enclosed processing passages.

Referring now to FIGS. 5 and 7, an inlet opening 80 in housing 14 is provided to feed liquid plastic or polymeric material to devolatilization passage 30. Alignment element 100 is positioned near inlet 80 so that member 116 can spread the liquid material fed to passage 30 along the channel walls. Preferably element 100 is positioned as close to inlet 80 as will allow development of sufficient pressure by the action of the channel side walls dragging forward material fed to passage 30 to force and drag the liquid material through the clearance provided by sides 108 (FIG. 6) of liquid spreading member 116 so that the material is spread as thin layers 42 carried forward by rotating side walls 22.

Alignment element 100 as shown in FIGS. 5 and 6 comprises a base member 101 having a first rigid member 102 extending into passage 30 and is securely fixed in and carried by base member 101. Flexible connecting members 115 connect second floating member 116 to member 102. Second member 116 is shown as having a liquid spreading surface 117 which can vary in shape so long as the shape selected provides a surface which can distribute or spread the material as thin layers on walls 22. As shown in FIGS. 5 and 6, member 116 extends toward the inlet and provides a rounded radially disposed leading surface 117 and sides 108 diverging from surface 117 to sides 118 to distribute the material as thin layers 42 on walls 22. Flexible connecting members 115 provide controlled flexibility between member 102 and member 116 so that hydrodynamic action of material flowing toward surface 117 of member 116 will automatically center second floating member 116 in the channel 30. This positioning can be achieved even though member 102 may not be positioned axially in a center line position of passage 30.

As best shown in FIG. 6, central portions 44 of the channel 30 downstream of member 116 in the direction of the movement of the channel walls are kept free of plastic or polymeric material by member 116 so that the thin layers 42 have free surfaces exposed to the free central space 44 for transfer of substances to space 44 from the layers 42. For example, volatiles in layers 42 may pass into the free space and be withdrawn through an exit port from the channel, with the aid of vacuum if desired, to effect devolatilization. As shown in FIG. 5, element 100 can include and provide a port 109 to introduce or withdraw materials to or from free space 44. Also, another port 54 (FIG. 5) can be positioned downstream along passage 30 to introduce materials to or withdraw materials from passage 30 at or near outlet 90.

Mixing and rearrangement of the material of layers 42 on channel walls 22 to aid the devolatilization or other transfer of material between central free space 44 and the material of layers 42 may be effected by disposing mixing elements (not shown) but described in application Ser. No. 849,184 to engage layers 42 conveyed by channel walls 22. Mixing elements such as bar or knife spreaders or pins, rods and so on, may be used. A particularly preferred arrangement for mixing materials of layers 42 on channel walls 22 is illustrated in FIG. 9 and will be discussed in connection with that figure.

FIGS. 7–10 further illustrate the preferred embodiment of this invention and taken with FIG. 5 particularly illustrate the adaptability and versitility of the alignment elements of the invention in a plurality of interconnected processing passages.

As shown in FIG. 7, a plurality of processing passages 30, 32 and 34, are arranged adjacent each other along rotor 10. Each passage receives a member 70 providing a material collecting end wall surface 71 and transfer passageways 90, 92 and 94 are provided for transferring material from one processing passage to an interconnected processing passage. Transfer passageways 90, 92 and 94 are formed in coaxial inner cylindrical surface 24 of housing 14.

Flow of material in the processing passages and transfer of material from one passage to another will be better understood by referring to the flow diagram shown in FIG. 8 taken in connection with FIGS. 5, 7, 9 and 10. FIG. 8 is an idealized and simplified presentation with arrows indicating flow direction of material transferred from one passage to another through transfer channels 90, 92 and 94. Referring again to FIG. 5, viscous material is fed to passage 30 through inlet 80 where element 100 is positioned so that the material is spread along the channel walls as thin layers by surface 117 of member 116 which also provides a free central space 44 on the discharge side of member 116. The free central space extends along passage 30 from spreader member 116 to a pool 64 of viscous material collected at end wall 71 of member 70. Additionally, alignment means 100 can provide port 109 to introduce materials to or withdraw materials from the free space 44. Also, as shown in FIG. 5, another port 54 may also be provided to introduce materials to or to withdraw materials from passage 30. As shown in FIGS. 5, 7 and 8, material processed in passage 30 collected at surface 71 and discharged into passage 32 through transfer passageway 90.

Material fed to passage 32 (FIG. 9) through passageway 90 is further processed such as by spreading along the channel walls as a thin film by another member 116 located near transfer passage 90. Another alignment element 110A may also be positioned in passage 32 downstream between transfer passage (inlet) 90 and member 70 in passage 32. Element 110A has a spreader member 116a flexibly connected by flexible connecting members 115a to a first member 102a which is securely fixed in and carried by base member 101a. The arrangement of elements 100 and 100a shown in passage 32 of FIG. 9 has particular advantages since it provides separated free central spaces along passage 32 downstream from each spreader member 116 and 116a. Port 109 of element 100 can be used to introduce materials to or withdraw materials from the first free space while port 54 can provide the same function for the second free space. The arrangement of elements 100 and 100a as shown in passage 32 of FIG. 9 for sequential spreading of material provides especially efficient mixing for materials carried as thin layers along the channel walls. Also, the arrangement provides the capability of using ports 109 and 54 to perform the same or different operational functions. For example, port 109 may be used to remove material from the first free space while port 54 may be used to add material to the second free space for mixing with the thin layer of material carried by the walls. Alternatively, port 109 and port 54 may be used to add different materials to the first and second free spaces respectively. Material processed in processing passage 32 is collected at its end wall 71 for discharge from passage 32 through transfer passageway 92 to passage 34 (FIG. 10).

As shown in FIG. 10, material is fed to passage 34 through transfer passageway 92. The material is spread as thin layers along the channel walls by a further spreader member 116 of an element 100 in the same manner described before for passages 30 and 32. The free central space provided in processing passage 34 extends from spreader member 116 to the region of the pool of viscous material collected at surface 71 of member 70. Three ports, 109, 55 and 54 are shown positoned along passage 34 in communication with the free central space. Port 109 is positioned near the inlet (92) while port 54 is positioned near member 70 and transfer passageway 94 and port 55 is positioned between ports 109 and 54. This integration of alignment elements of this invention arranged with a plurality of ports further illustrates the improved versatility and adaptability provided for processing passages using the material obstruction elements of this invention. Processed material collected at surface 71 of passage 34 is discharged through transfer passageway 94 to an outlet or to another interconnected processing passage.

Additional details relating to rotary processors having a plurality of processing passages arranged for internal transfer of material processed in one passage to another can be found in copending U.S. application Ser. No. 935,782 filed Aug. 21, 1978 by Zehev Tadmor and Peter Hold—two of the inventors of this application. Copending application Ser. No. 935,782 is incorporated here by reference.

Figure 11:
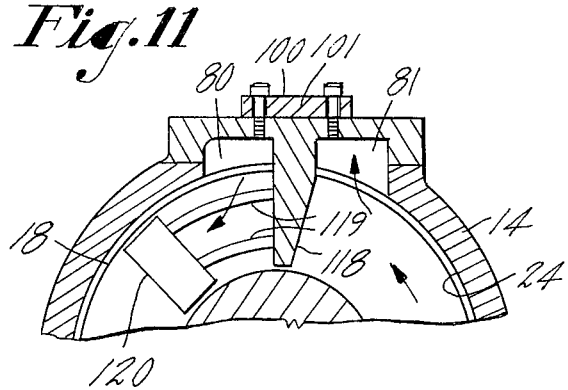
FIGS. 11-16 are simplified, side sectional and top sectional views of alternative embodiments of the invention.
Figure 12:
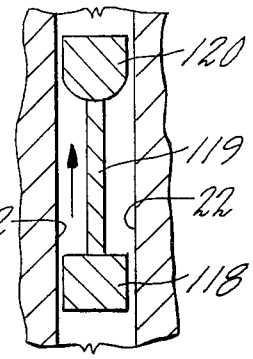

The versatility and adaptability provided processing passages by this invention will be further appreciated by reference to FIGS. 11-17 which illustrate other alternative embodiments of the invention. Referring first to FIGS. 11 and 12, alignment element 100 is shown positioned near inlet 80 of the passage. Element 100 as shown, comprises a first solid member 118 which also functions as the member providing the material collection end wall for discharge of material through outlet 81. Flexible connecting members 119 extend downstream from first member 118 and connect first member 118 to a second floating member 120. Member 120 is shaped (FIG. 12) so that its surface can obstruct and spread liquid material fed to the passage through inlet 80 along the walls in the manner described before.

Figure 13:
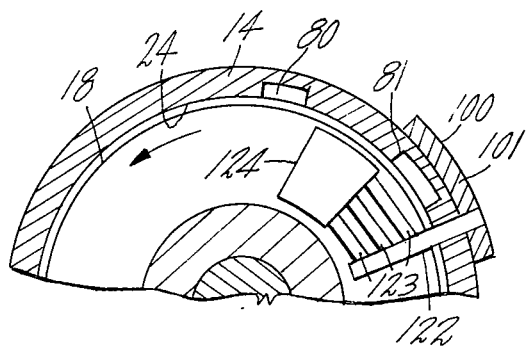
Figure 14:
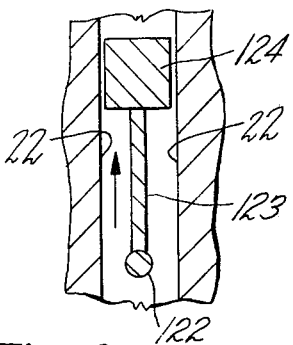

FIGS. 13 and 14 illustrate another embodiment of the invention in which element 100 is positioned near outlet 81 and has a rigid first member 122 extending into the passage from base member 101 at a position upstream of outlet 81. Flexible connecting member (123) connects rigid member 122 to a floating second member 124 which as illustrated, functions as the member providing the material collecting end wall surface for the passage and can also provide the surface for blocking movement of material in the passage.

Figure 15:
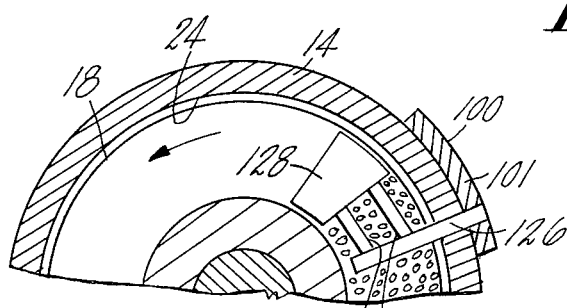
Figure 16:
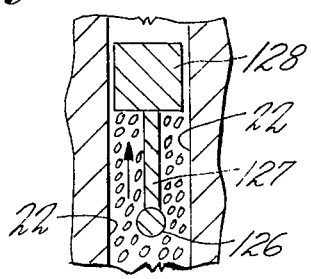

Still another embodiment within the scope of this invention is illustrated in FIGS. 15 and 16. Element 100 is shown there positioned along the passage between the inlet and outlet. Rigid member 126 extends into the passage which is shown containing particulate (unmelted) polymeric material. Flexible connecting member 127 connects member 126 to floating member 128 shaped to obstruct passage of unmelted particulate polymeric material at a fixed position in the passage and to permit only melted material to be dragged past member 128 by the moving side walls of the passage.

Figure 17:
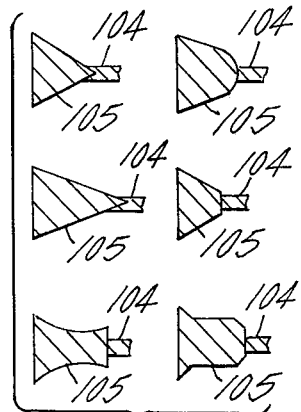
FIG. 17 is a simplified partial top sectional view of alternative embodiments of the invention.

FIG. 17 illustrates some of the shapes that the floating obstruction member of the novel elements of this invention can assume. Materials of construction used to fabricate the novel material obstruction elements can vary but metals are preferred.

The above description of a particularly preferred embodiment has related to elements in which one solid member carried by the base member is flexibly connected to a processing member. However, elements having a plurality of solid members carried by the base member each flexibly connected to respective processing members are definitely contemplated within the scope of this invention. Elements having a plurality of flexibly connected members are especially adaptable for positioning processing members in separate selected processing passages which may be adjacent or non-adjacent passages. Also, such elements can provide the same or different processing members for selected, separate processing passages.

From the above description, it should be apparent that the novel alignment elements of this invention and the integration of the elements with processing passages provide many distinctive and unexpected advantages. One distinct and readily perceptible advantage is that the degree of precision required for alignment of a processing member in a processing passage is greatly reduced particularly when narrow channels are involved. Another advantage is that the elements used to perform various processing functions such as blocking, collecting, mixing, spreading etc. may be interchanged and the positioning of the elements in preselected positions along the passage may easily be varied to greatly increase the versatility and adaptability of the processing passages. Accordingly, the invention presents to the art novel apparatus having unexpectedly improved processing capabilities as compared to processing apparatus known to the art at the time this invention was made.

We claim:

1. In processing apparatus which comprises a rotatable element carrying at least one annular processing channel; and a stationary element providing a coaxial surface cooperative with the processing channel to form with the channel an enclosed processing passage, said stationary element having an inlet to feed material to the processing passage and an outlet spaced apart from the inlet a major portion of the circumferential distance for discharging material from the passage and, a member associated with the stationary element and extending into the channel to provide a material collecting end wall, the improvement in which:

at least one non-rotatable member in the channel for at least partially obstructing movement of material urged toward the outlet by rotating walls of the channel but providing clearances at opposite sides of the member for passage of material between the member and the channel walls; and means flexibly connecting the member to the stationary element for self-centering movement between the channel side walls in response to hydrodynamic action caused by rotating the channel walls toward the outlet.

2. Apparatus of claim 1 in which the member provides a blocking surface which coacts with the rotating walls of the channel to establish relative movement between the channel walls and the material.

3. Apparatus of claim 1 in which the flexibly supported member is shaped to spread liquid material along the rotated walls and provides a free central space along a portion of the passage in the direction of the outlet.

4. In apparatus for processing solid and viscous plastic and polymeric materials which comprises a rotatable element carrying at least one annular processing channel; a stationary element providing a coaxial surface cooperative with the processing channel to form an enclosed processing passage, said stationary element having an inlet to feed material to the processing passage and an outlet spaced apart from the inlet a major portion of the circumferential distance for discharging material from the passage and a member associated with the stationary element and extending into the channel and providing a material collecting end wall, the improvement in which:

at least one element is positioned in the channel for processing and comprises, a first member extending from the coaxial surface into the channel; a second member flexibly connected to said first member so that the second member is centered axially in the channel by hydrodynamic action generated by movement of material past opposite sides of the second member caused by rotating the walls toward the second member.

5. Apparatus of claim 4 in which the flexibly connected member spreads liquid material along the rotated walls and provides a free central space along a portion of the passage in the direction of the outlet.

6. Apparatus of claim 4 in which the flexibly connected member restrains substantial movement of particulate material in the channel and permits only liquid material to be dragged by the rotated walls past the member.

7. Apparatus of claim 4 where the first member is positioned at the outlet and has a surface providing an end wall for the passage at which processed material is scraped from the channel walls and collected for discharge from the passage.

8. Apparatus of claim 4 where the flexibly connected member is positioned at the outlet and has a surface providing an end wall for the passage at which processed material is scraped from the channel walls and collected for discharge from the passage.

9. An element for aligning a processing surface providing member in a processing channel of a rotary processor, said aligning element comprising a base member having top and bottom surfaces and adapted for attachment to a stationary element of the rotary processor and at least one solid, fixed member carried in and extending from the bottom surface of the base member and flexibly connected to a processing surface providing member.

10. An element of claim 11 where said solid, fixed member also provides a processing surface.

11. An element of claim 11 where said flexibly connected processing member is shaped and dimensioned to provide a surface that can block movement of material in the channel.

12. An element of claim 11 where said flexibly connected processing member is shaped and dimensioned to provide a surface that can spread liquid in the channel on the walls of the processing channel and provide a clearance between the sides of the member and the processing channel walls.

13. An element of claim 11 where said flexibly connected processing member is shaped and dimensioned to provide a surface that can restrain movement of particulate material fed to the channel and only permit liquid material in the channel to be dragged by the channel walls past the flexibly connected member.

14. An element of claim 9 where said flexibly connected processing member is shaped and dimensioned to provide an end wall surface for the channel at which processed material is scraped from the channel walls and collected for discharge from the passage.

15. An element of claim 9 where more than one solid fixed member flexibly connected to a processing surface providing member is carried by the base member and each flexibly connected processing surface providing member is spaced apart from each other by a predetermined distance so that each flexibly connected processing surface providing member can be positioned in separately selected processing channels.

16. An element of claim 10 where the solid fixed member is shaped and dimensioned to provide an end wall surface for the channel at which processed material is scraped from the channel walls and collected for discharge from the passage.

* * * * *

UNITED STATES PATENT OFFICE
CERTIFICATE OF CORRECTION

Patent No. 4,255,059  Dated  March 10, 1981

Inventor(s) Peter Hold, Zehev Tadmor and Lefteris Valsamis

It is certified that error appears in the above-identified patent and that said Letters Patent are hereby corrected as shown below:

Claim 10 - Change dependency of claim from 11 to 9.
Claim 11 - Change dependency of claim from 11 to 9.
Claim 12 - Change dependency of claim from 11 to 9.
Claim 13 - Change dependency of claim from 11 to 9.

Signed and Sealed this

Sixteenth Day of June 1981

[SEAL]

Attest:

RENE D. TEGTMEYER

Attesting Officer  Acting Commissioner of Patents and Trademarks